Dec. 11, 1934. G. C. CREASY 1,983,899
STEAM COOKER AND LIKE APPARATUS
Filed Dec. 23, 1933

Inventor
GEORGE C. CREASY
By Mason Fenwick Lawrence
Attorneys

Patented Dec. 11, 1934

1,983,899

UNITED STATES PATENT OFFICE 1,983,899

STEAM COOKER AND LIKE APPARATUS

George C. Creasy, Gretna, Va.

Application December 28, 1933, Serial No. 704,316

4 Claims. (Cl. 53—1)

This invention relates to steam cookers and like apparatus.

It has for its general object the provision in a culinary device of a steam generator characterized by the extensiveness of its heat absorbing surface, and the separation of the contained water into thin layers in contact with said surface whereby steam is generated quickly and with efficiency.

Another object of the invention is the provision in a steam cooker or water heater of a steam generator at the bottom of the cooking chamber having means for accelerating the upward flow of the steam jet, for promoting rapid circulation through the cooking chamber.

Other and more specific objects will appear as the following description of several exemplary embodiments of the invention proceeds.

In the drawing which accompanies and forms a part of the following specification and throughout the several figures of which the same characters of reference have been employed to designate identical parts:

Referring now in detail to the several figures, the numeral 1 represents a kettle or container having the steam generator 2 connected to the bottom thereof and extending downwardly beyond said bottom. The kettle 1 is adapted to be placed over the open hole of a range after removal of the lid, with the generator 2 in direct exposure to the radiant heat from the fire. If the length of the generator 2 is such that it would come in contact with the bed of coals, the adapter 3 is interposed between the rim of the stove hole and the bottom of the kettle. It is obvious that the adapter 3 is not essential to the invention.

Figure 3:
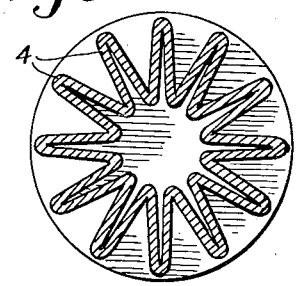
Figure 3 is a cross section taken on the line 3—3 of Figure 2, viewed in the direction of the arrows.

The steam generator as will be apparent from observation of Figure 3, has a deeply corrugated side wall 4, the corrugations preferably extending radially and being narrow so as to separate the water with which the generator is charged into a plurality of thin layers or films. The extensive surface thus provided, together with the small mass of water in contact with the areas of said surface insures a rapid generation of steam even with a low fire. The generator 2 communicates with the kettle 1 by means of an aperture 5 and it will be noted that this aperture is of small area compared with the cross sectional area of the generator 2 so that the discharge of steam through the aperture 5 is somewhat throttled, and a slight pressure built up in the generator 2 which insures that the steam will issue from the aperture 5 into the kettle with some force.

Figure 1:
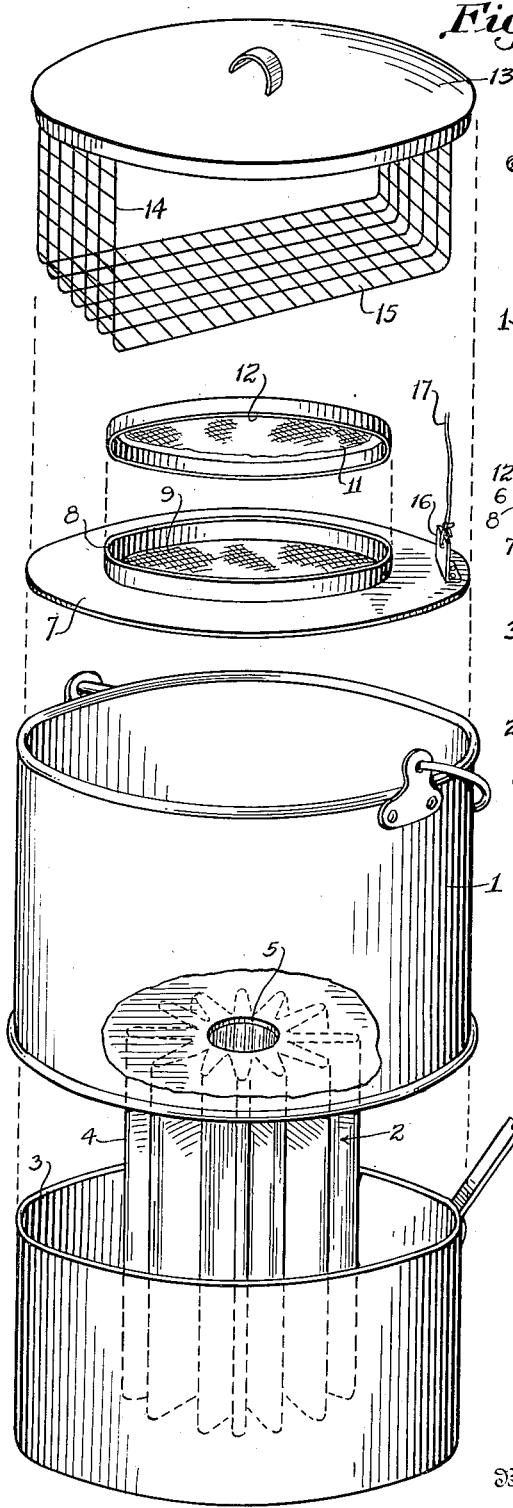
Figure 1 is an exploded view of one form of the steam cooker.
Figure 2:
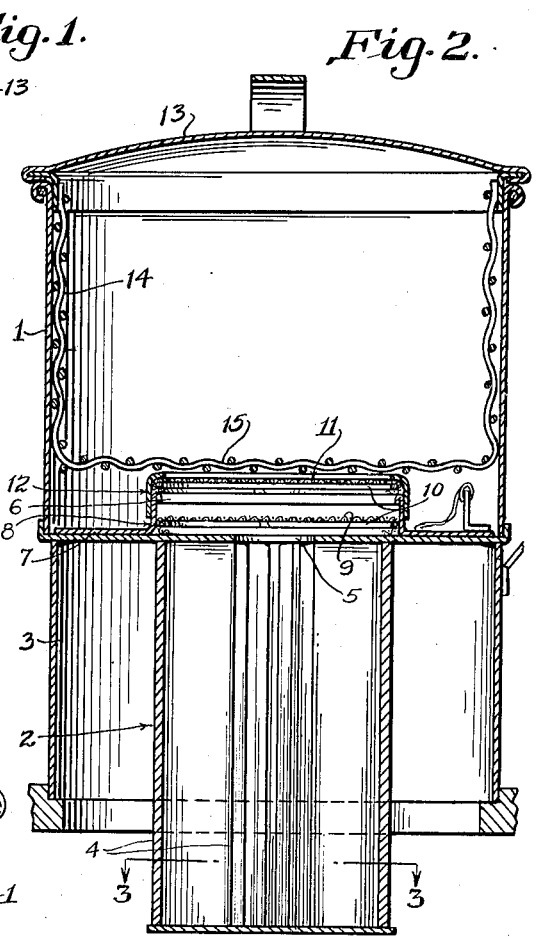
Figure 2 is a vertical diametrical section through this form of cooker.

In the exercise of its function as a steam cooker, the kettle may be provided with a cell 6 for percolating coffee, said cell comprises an annular plate 7 adapted loosely to rest in the bottom of the kettle above the steam generator and having an upstanding flange 8. A filter membrane 9 which may be a piece of muslin or of metallic cloth is mounted inside the flange 8. Figure 2 shows that in the event the filter is of flexible fabric, it may be retained in place by a snap ring 10 which presses the marginal portions of the filter membrane against the inner side of the flange 8.

A second filter membrane 11 rests upon the upper edge of the flange 8 and is retained by a ring 12 which presses its marginal portions over the flange 8. The ring 12 is readily removable for the insertion of the charge of coffee. The force with which the steam issues through the aperture 5 insures that all parts of the mass of coffee will be thoroughly percolated by the steam. The kettle 1 is provided with a lid 13 from which depends a rack 14 preferably of reticulated construction. This rack serves two functions. Primarily it holds a vessel for containing vegetables or other articles to be steamed. Its secondary function is in co-operation with the coffee cell 6. The bottom 15 of the rack 14 is preferably arranged so close to the top of the cell 6 as to prevent the latter rising materially from its seat and permitting the steam to by-pass around the edges of the plate 7. For convenient removal of the coffee cell, the plate 7 may be provided with a lug 16 to which may be attached any desirable form of flexible handle such as the cord 17.

The operation of the steam cooker above described is obvious without detailed explanation.

It will be understood by those skilled in the art that the details of construction of my invention as shown and described are merely by way of example and not to be construed as limiting the scope of the invention; that while I have illustrated the generic concept in connection with small culinary apparatus and the like, it is obvious that the principles of the invention may be applied to devices for producing commercial power or hot water or steam for commercial uses without transcending the scope of the invention as claimed.

What I claim is:

1. Water heater or culinary device comprising a vessel, a steam generator unitary with the lower part of said vessel having longitudinally corrugated sides adapted to be exposed in heat exchanging relation to a source of heat, the upper part of said generator communicating with the space within said vessel through an opening smaller than the cross sectional area of said generator, whereby steam will be projected upward into said vessel with appreciable force.

2. Water heater or culinary device comprising a vessel, a steam generator unitary with the lower part of said vessel and extending therefrom, having longitudinally corrugated sides adapted to be exposed in heat exchanging relation to a source of heat, the upper part of said generator communicating with the space within said vessel through an opening smaller than the cross sectional area of said generator whereby steam will be projected upward into said vessel with appreciable force.

3. Water heater or culinary device comprising a vessel, a steam generator unitary with the lower part of said vessel and extending downwardly therefrom, having the side wall thereof formed with deep vertical corrugations and adapted to be exposed in heat exchanging relation to a source of heat, the upper part of said generator communicating with a space within said vessel by an opening smaller than the cross sectional area of said generator, whereby steam will be projected upward into said vessel with appreciable force.

4. Water heater or culinary device as claimed in claim 3, including an annular plate adapted to rest in the bottom of said vessel, and a coffee cell mounted on said plate having its top and bottom faces formed of steam permeable membranes overlying the opening between said vessel and said generator.

GEORGE C. CREASY.